3,143,467
ANTHELMYCIN AND A PROCESS FOR ITS PRODUCTION
Robert L. Hamill, Marvin M. Hoehn, and James M. McGuire, Indianapolis, Ind., assignors to Eli Lilly and Company, Indianapolis, Ind., a corporation of Indiana
Filed Feb. 19, 1962, Ser. No. 173,950
5 Claims. (Cl. 167—65)

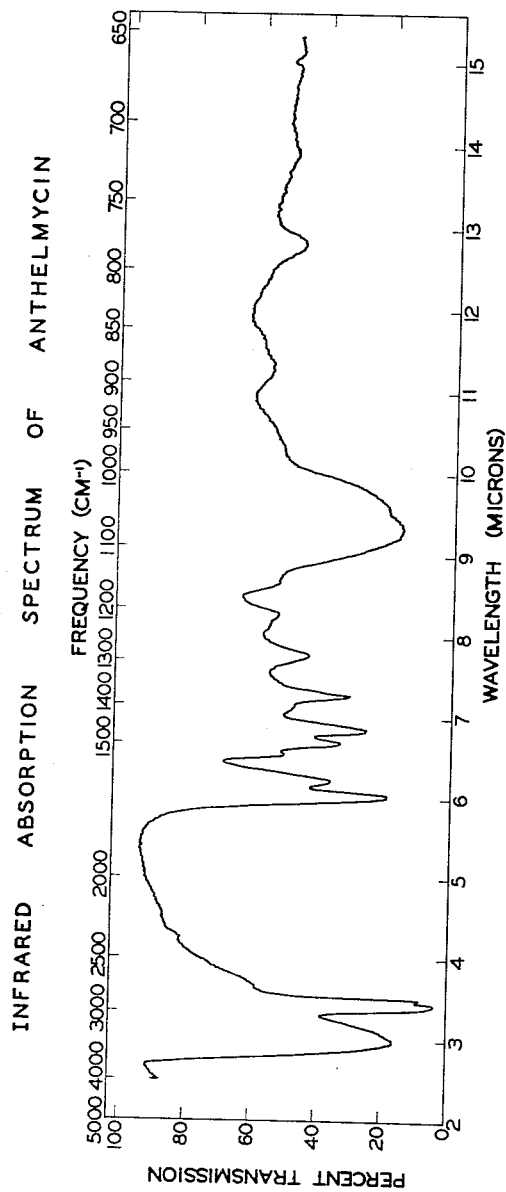

This invention relates to a novel antibiotic agent and to its preparation. More particularly, this invention relates to a novel nitrogenous antibiotic agent denominated herein by the arbitrary name anthelmycin.

Anthelmycin is a white crystalline powder, quite soluble in water and acidic aqueous solutions and soluble to the extent of about 7 mg. per ml. in methanol at room temperature. It is insoluble in solvents such as ethanol, acetone, chloroform, butanol, ether, and the like. Anthelmycin decomposes above 200° C. It is very stable in solution over a pH range of about pH 1 to pH 10 at 5° and 25° C., being essentially unchanged after seven days.

In water solution, at a temperature of 25° C., the specific rotation of sodium D light by anthelmycin is −17.5° when the concentration of the antibiotic is 1.58 percent on a weight-per-volume basis.

Electrometric titration of anthelmycin in water indicates titratable groups of pK′a 3.3, 6.8, and 7.9. In 66 percent aqueous dimethyl formamide, titratable groups of pK′ a 3.3, 6.8, and 8.2 are seen.

An average of several elemental analyses has shown anthelmycin to have approximately the following composition: 44.39 percent carbon, 6.53 percent hydrogen, 10.39 percent nitrogen, and 38.69 percent oxygen. The molecular weight of the anthelmycin base, calculated from the experimentally obtained titration data, was determined to be about 660.

The ultraviolet absorption spectrum of anthelmycin in neutral and basic aqueous solution shows intense absorption maxima at about 234 m$\mu$ and 267 m$\mu$ with absorptivity values $$E_{1\ cm.}^{1\ percent} = 127 \text{ and } 135.5$$

respectively; in aqueous acid solution a single absorption maximum at about 274 m$\mu$ with an absorptivity value of $$E_{1\ cm.}^{1\ percent} = 198$$

is observed.

The infrared absorption curve of the crystalline free base in a mineral oil mull is shown in the accompanying drawing. The following distinguishable, somewhat broad absorption maxima are observed: 2.99, 6.04, 6.23, 6.69, 7.1 (shoulder), 7.77, 8.27, 8.65 (shoulder), 9.32, 9.7 (broad shoulder), 10.5 (broad shoulder), 11.3, and 12.8 microns.

A number of qualitative chemical tests have been carried out with anthelmycin with the following results:

| Test | Result |
|---|---|
| Dische test for uronic acids | Negative. |
| Oricinol test for pentoses | Do. |
| Folin's test for phenol | Do. |
| Anthrone test for unsubstituted sugars | Do. |
| Elston-Morgan test for amino sugars | Positive. |
| Amino nitrogen—before hydrolysis | Do. |
| Amino nitrogen—after hydrolysis | Do. |
| Amide nitrogen | Negative. |
| Sakaguchi test for guanidino groups: | |
| Before hydrolysis | Do. |
| After hydrolysis | Do. |
| Test for tryptophane | Do. |
| Ninhydrin test for alpha-amino acids | Positive. |

Chromatography of anthelmycin on Whatman No. 1 paper gives an $R_f$ value of 0.21 in a solvent system composed of nine parts of methanol to one part of water-saturated n-butanol and having dissolved therein 2 percent by weight of p-toluenesulfonic acid and 2 percent by weight of piperidine. In determining the $R_f$ value, the antibiotic was applied to the paper in aqueous solution.

By employing methods well known in the art, acid addition salts of anthelmycin can be prepared with mineral acids such as hydrochloric acid, sulfuric acid, phosphoric acid, and the like, and also with organic acids such as p-toluenesulfonic acid, salicylic acid, tartaric acid, and the like. When aqueous solutions of anthelmycin are treated with solutions of phosphotungstic acid, methyl orange, flavianic acid, or Reinecke salt, precipitates are formed which can be employed for recovery of the antibiotic from solution. Anthelmycin can be recovered from the precipitates by treatment with excess aqueous acid or alkali to cleave the complex salt or adduct, followed by extraction and ion-exchange column procedures.

The acid addition salt of anthelmycin with p-(p′-hydroxyphenylazo)benzenesulfonic acid is a beautifully crystalline orange derivative which decomposes above 218° C. Titration data indicate that the salt contains 3 moles of p-(p′-hydroxyphenylazo)benzenesulfonic acid for each mole of anthelmycin base. The molecular weight of the acid addition salt, calculated from experimentally obtained titration data, was determined to be about 1525, a value which agrees within the limitations imposed by inherent experimental error with the value calculated by adding the molecular weights of the free base and the salt-forming acid.

A powder X-ray diffraction pattern of this salt using nickel-filtered copper radiation and a wave-length value of 1.5405 A. for calculating the interplanar spacings gives values as follows:

| d | $I/I^1$ |
|---|---|
| 12.70 | .10 |
| 7.78 | .20 |
| 7.27 | .20 |
| 6.70 | .20 |
| 6.41 | .75 |
| 6.06 | .10 |
| 5.50 | .30 |
| 5.11 | .30 |
| 4.88 | .20 |
| 4.69 | .20 |
| 4.41 | 1.00 |
| 4.23 | 1.00 |
| 4.06 | .10 |
| 3.94 | 1.00 |
| 3.73 | .30 |
| 3.64 | .30 |
| 3.50 | .20 |
| 3.38 | .30 |
| 3.31 | .30 |
| 3.19 | .40 |
| 3.13 | .40 |
| 3.03 | .20 |
| 2.87 | .10 |
| 2.76 | .20 |
| 2.60 | .05 |
| 2.55 | .05 |
| 2.44 | .05 |
| 2.38 | .05 |
| 2.20 | .10 |
| 2.13 | .10 |
| 2.00 | .05 |

The free base of anthelmycin has an inhibitory action against the growth of microbial organisms, both bacteria and fungi, which are pathogenic to animal and plant life. The inhibitory concentrations, determined by the agar-dilution test, for a number of illustrative organisms are listed in Table I.

TABLE I

| Test Organism | Minimum Inhibitory Concentration (mcg./ml.) |
|---|---|
| Staphylococcus aureus | >200 |
| Bacillus subtilis | 100 |
| Mycobacterium tuberculosis (607) | 50 |
| Mycobacterium avium | 25 |
| Escherichia coli | 200 |
| Proteus vulgaris | 200 |
| Aerobacter aerogenes | 50 |
| Klebsiella pneumoniae | 50 |
| Salmonella enteritidis | 100 |
| Shigella paradysenteriae | 50 |
| Agrobacterium tumefaciens | 50 |
| Corynebacterium michiganense | 200 |
| Erwinia amylovora | 100 |
| Pseudomonas solanacearum | 100 |
| Xanthomonas phaseoli | 50 |
| Alternaria solani | 12.5 |
| Aspergillus niger | 100 |
| Ceratostomella ulmi | 12.5 |
| Colletotrichum pisi | 100 |
| Endoconidiophora fagacearum | 100 |
| Helminthosporium sativum | 25 |
| Penicillium expansum | 100 |
| Pullularia sp | 100 |
| Verticillium albo-atrum | 25 |

The acute toxicity of anthelmycin in mice, expressed as $LD_{50}$, is about 4 mg. per kilogram of body weight when the antibiotic is administered intravenously; orally, the $LD_{50}$ is about 150 mg. per kilogram of body weight. A 0.001 percent aqueous solution was not irritating when applied to rabbits' eyes, while a 0.1 percent solution was nonirritating to the skin of the animals.

When administered orally in suitable dosage forms such as capsules, tablets, suspensions, and the like, or, more conveniently, as a component of the diet, anthelmycin is effective in removing from an infected host animal parasites such as pinworms, roundworms, whipworms, strongyles, and the like. Its activity at various dosage levels against the mouse pinworm, *Syphacia obvelata* is illustrated in Table II.

TABLE II

| Dose | | Number of animals | Clearance,ᵃ percent | Worm Reduction,ᵇ Percent |
|---|---|---|---|---|
| Wt. Percent Drug in Diet | Mg./kg. | | | |
| Control | Control | 7 | 0 | 0 |
| .08 | 288 | 4 | 100 | 100 |
| .04 | 203 | 5 | 100 | 100 |
| .02 | 160 | 6 | 67 | 99 |
| .01 | 76 | 6 | 83 | 99 |
| .005 | 44 | 6 | 0 | 0 |

ᵃ Percent clearance = $\frac{\text{Number of animals free of worms}}{\text{Total number of animals}} \times 100\%$.

ᵇ Percent worm reduction = $\frac{\text{Ave. number of worms per control animal less ave. number of worms per treated animal}}{\text{Ave. number of worms per control animal}} \times 100\%$.

When fed to swine at a level of 12 g. per ton of normal swine ration, anthelmycin effected the elimination of 80 percent of the total populations of *Ascaris suis* (large roundworms), 100 percent of *Oesophagostumum* spp. (strongyles), and 100 percent of *Trischuris suis* (whipworms). In addition to its anthelmintic properties, the antibiotic also has housefly larvicidal activity, producing a kill rate of 91 to 100 percent at a dilution of 250 p.p.m.

The novel antibiotic of this invention is produced by culturing an anthelmycin-producing strain of an actinomycete organism under aerobic conditions in a suitable culture medium until the culture medium contains substantial antibiotic activity. The antibiotic can be recovered by employing various isolation and purification procedures known in the art. For use in pharmaceutical-type medicinals such as tablets or capsules, the anthelmycin is preferably processed to a relatively pure form. A lesser degree of purification is satisfactory when the antibiotic is to be incorporated in a feedstuff for animal use. In such case, the anthelmycin need not be recovered as a solid, but can, if desired, be sprayed onto the feedstuff or a carrier as a concentrated solution.

Because of the uncertainty of taxonomic studies with the Sterptomyces group of organisms, there is always an element of doubt associated with the classification of a newly discovered organism. However, the organism which produces anthelmycin appears to resemble most nearly in the most important characteristics the actinomycete, *Streptomyces longissimus,* first isolated by Krassilnikov and described in Bergey's Manual of Determinative Bacteriology, Seventh Edition (1957), and is considered to be a strain thereof. Inasmuch as attempts to obtain an authentic culture of the Krassilnikov strain have been unsuccessful, our comparison is based upon the published description thereof. Notable differences between our novel strain and the Krassilnikov strain of *S. longissimus* are the inability of our strain to utilize cellulose as a source of carbon and the failure of our strain to develop an aerial mycelium on potato plug. The strain of the organism which we have employed for the production of anthelmycin has been placed on permanent deposit with The American Type Culture Collection at Washington, D.C., and has been assigned the culture number ATCC 14562. This strain was isolated from a soil sample collected in Ripley County, Indiana. The organism was isolated from the soil sample by suspending portions of the soil sample in sterile distilled water and streaking the suspensions on nutrient agar. The seeded nutrient agar plates were incubated at 25–35° C. until organism growth was secured. At the end of the incubation period, colonies of the anthelmycin-producing organisms were transferred with a sterile platinum loop to agar slants. The agar slants were then incubated to provide suitable qualtities of inoculum for the production of anthelmycin.

The methods employed in the taxonomic studies of the anthelmycin-producing strain of *S. longissimus,* ATCC 14562, are those commonly used in the taxonomy of actinomycetes. Carbon utilization tests were carried out according to the method described by Pridham and Gottlieb, J. Bact., 56:107 (1948). Results of the taxonomic studies are sumarrized in the paragraphs which follow. The numbers in parentheses refer to color blocks in Maerz and Paul, Dictionary of Color (1950). Observations were made after incubation at 30° C. for fourteen days. Carbon utilization was determined after ten days at the same temperature.

*Microscopic Morphology, Cultural Characteristics, and Physilogy*

Spore chain morphology.—Spores are in straight or flexuous chains. Spores are normally 0.7 to 1.0μ in width and 1.4 to 3.5μ in length.

Colony characteristics on:
  Tomato paste-oatmeal.—Excellent growth, with abundant aerial mycelium. White to cream (9–20), reverse orange (9–10G). No soluble pigment.
  Nutrient agar.—Moderate growth, with fair aerial mycelium. White, reverse orange (10–7K). No soluble pigment.
  Yeast extract agar.—Moderate growth, with moderate aerial mycelium. White, reverse brownish yellow (11–7J). No soluble pigment.
  Calcium malate agar.—Moderate growth, with moderate aerial mycelium. White, reverse yellow-orange (10–5K). No soluble pigment.
  Inorganic salts-starch agar.—Excellent growth, with sparse aerial mycelium. White, reverse dark orange (9–10G).

*Czapek's agar.*—Moderate growth, with abundant aerial mycelium. White to pale yellow, reverse yellow-orange (10–5K). Slight, orange-brown soluble pigment.

*Potato plug.*—Fair growth, with no aerial mycelium. Orange. Plug light brown.

*Action on milk.*—Coagulated at six days, peptonized at fourteen days.
*Nutrient gelatin.*—Complete liquefaction after fourteen days.
*Nitrate reduction.*—None.
*$H_2S$ production.*—None.

Table III summarizes the results of the carbon utilization tests carried out on the anthelmycin-producing strain of *S. longissimus*, ATCC 14562. In the table, the symbols employed are interpreted as follows:

+ = growth and utilization
− = no growth, no utilization

TABLE III
*Carbon Utilization of S. logissimus, Strain ATCC 14562*

| Substrate | Response | Substrate | Response |
| --- | --- | --- | --- |
| L (+) Rhamnose | − | Sucrose | + |
| D (+) Ribose | + | D (+) Trehalose | + |
| D (+) Xylose | + | Inulin | − |
| Dextrose | + | D (+) Raffinose | − |
| D (−) Fructose | + | i-Inositol | + |
| D (+) Mannose | + | d-Mannitol | + |
| Lactose | − | d-Sorbitol | − |
| Maltose | + | Cellulose | − |
| Salicin | − | | |

As previously noted, strain ATCC 14562 can be grown in a culture medium to produce anthelmycin. The culture medium can be any one of a number of media since, as is evident from the above-described utilization tests, the organism is capable of utilizing energy from a variety of sources. However, for economy of production, maximum yield, and ease of isolation of the antibiotic, certain culture media are preferable. Thus, for example, molasses is one of the preferred sources of carbohydrate, although glucose, fructose, sucrose, maltose, starch, inositol, and the like, can also be used. Preferred nitrogen sources are corn steep, soybean meal, peptones, distillers' solubles, casein, amino acid mixtures, and the like. Inorganic salts can also be employed as a source of nitrogen.

Nutrient inorganic salts to be incorporated in the culture media can include the customary salts capable of yielding sodium, potassium, ammonium, calcium, phosphate, chloride, sulfate, acetate, carbonate, and like ions. Additionally, sources of growth factors such as distillers' solubles and yeast extracts can be included with enhanced results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The organism used to produce anthelmycin is tolerant of considerable variations as to growth conditions. Thus, for example, the organism will grow in numerous media of widely varied pH. However, prior to inoculation with the organism, it is desirable to adjust the pH of the culture medium to between about pH 6.5 and pH 7.3, depending upon the particular medium employed. As is the case with other actinomycetes, the medium gradually becomes more alkaline and may attain a pH from about pH 7.0 to about pH 8.0, or higher, during the growth period of the organism while anthelmycin is being produced. The final pH is determined, at least in part, by the initial pH of the medium, the buffers present in the medium, and the period of time for which the organism is permitted to grow.

Preferably, just as for other antibiotics, submerged, aerobic culture in large tanks is employed for the production of substantial amounts of anthelmycin. Small quantities of the antibiotic are obtained conveniently by shake flasks and surface culture in bottles. In order to avoid a pronounced lag in the production of the antibiotic and the attendant inefficient utilization of equipment, it is preferable to use the vegetative rather than the spore form of the organisms for inoculation of the medium in the production tanks. Accordingly, a vegetative inoculum of the organisms is first prepared by inoculating a relatively small quantity of the culture medium with the spore form of the organism, and the young, active, vegetative inoculum so obtained is then transferred aseptically to the large tanks. The medium in which the vegetative inoculum is produced can be the same as that utilized for the production of the antibiotic, although it need not be.

The organism can be grown well at temperatures between about 25° C. and about 32° C. or somewhat higher. Optimal production of anthelmycin appears to occur when the culture medium is maintained at 26–30° C.

As is customary in producing antibiotics by submerged culture processes, sterile air is blown through the culture medium. For efficient growth of the organism and antibiotic production the volume of air employed in the tank production of anthelmycin preferably is upwards of 0.1 volume of air per minute per volume of culture medium. More efficient growth and antibiotic production are secured when the volume of air used is at least one-half volume of air per minute per volume of culture broth.

The rate of production of anthelmycin and the concentration of the antibiotic activity in the culture medium can readily be followed during the growth period of the microorganism by testing samples of the culture medium for their antibiotic activity against organisms known to be susceptible to the antibiotic, for example, *Mycobacterium avium*. The bio-assay can be carried out by the standard turbidimetric or cup-plate methods, or by paper disc assay upon agar plates.

In general, after inoculation of the culture medium, maximum production of the antibiotic occurs within about two to five days when submerged aerobic culture or shake flask culture is employed, and within about five to ten days when surface culture is used.

Anthelmycin can be recovered from the culture medium and separated from other substances which may be present by extractive and adsorptive techniques. Adsorption processes for recovery of anthelmycin are preferred at present because such procedures eliminate the relatively large volumes of solvents required when extractive techniques are employed. Carbon is a suitable adsorbent for separating the antibiotic from the filtered culture broth. The antibiotic substance fixed on the adsorbing agent is recovered by customary elution procedures.

For recovery of anthelmycin, ion exchange resins of acidic nature preferably are employed, for example, a cation exchanger consisting of a copolymer of methyl acrylate and a divinylbenzene having functional carboxyl groups, such as that available commercially under the trademark "IRC–50." Separation of anthelmycin from many of the acetic components of the culture broth is thus achieved by taking advantage of the basic nature of the antibiotic. The column on which the antibiotic is adsorbed can be eluted with aqueous ammonium hydroxide solution. Alternatively, the column can be eluted with dilute aqueous hydrochloric acid. The latter procedure, however, suffers from the disadvantage that all of the resin is returned to the acid cycle and must be reconverted with sodium hydroxide before it can be reused.

This invention is further illustrated by the following specific examples.

EXAMPLE 1

Spores of *Streptomyces longissimus* strain ATCC 14562 are inoculated on a nutrient agar slant having the following composition:

| | G. |
|---|---|
| Starch | 20 |
| Asparagine | 1 |
| Beef extract | 3 |
| Agar | 20 |
| Water, q.s. to make 1 l. | | and the slant is incubated for about five days at about 30° C. The slant is covered with a small amount of sterile distilled water and is scraped gently to loosen the organisms and obtain an aqueous suspension.

Ten ml. of the suspension so obtained is used to inoculate one liter of a sterile vegetative growth medium having the following composition:

| | G. |
|---|---|
| Cerelose | 15 |
| Soybean meal | 15 |
| Corn steep solids | 5 |
| Sodium chloride | 5 |
| Calcium carbonate | 2 |
| Water, q.s. to make 1 l. | |

The inoculated medium is grown for forty-eight hours at 30° C. with constant shaking on a reciprocal shaker to produce the vegetative form of the organism. This vegetative inoculum is then employed to inoculate a sterile production culture medium having the following composition, where the percentages of solid components are expressed on a weight-per-volume basis, while the glucose syrup is expressed on a volume-per-volume basis:

| | Percent |
|---|---|
| Soybean meal | 1.5 |
| Casein | 0.1 |
| Sodium nitrate | 0.3 |
| Calcium carbonate | 0.25 |
| Crude glucose syrup | 2.0 |
| Water, q.s. 175 gallons. | |

The inoculated culture medium contained in a 250-gallon fermentation tank is allowed to ferment at a temperature of about 30° C. and throughout the fermentation period is stirred and aerated with sterile air in an amount of about one-half volume of air per volume of culture medium per minute. The fermentation is allowed to proceed for about five days during which time the culture medium gradually increases in pH from an initial level of about 6.8 to about 7.8.

Eight hundred liters of fermentation broth so obtained is filtered with Hyflo filter-aid. The broth so obtained contains about 500 g. of anthelmycin, as determined by paper disc assay procdures using *Mycobacterium avium* as the test organism. The filtered broth is passed at a flow rate of about 100 ml. per minute over a column 8" x 40" in dimensions containing the cationic exchange resin sold commercially under the designation of "IRC–50" which has previously been washed with sodium hydroxide to place it in the sodium cycle. After all of the broth has been passed through the column, the resin is washed with deionized water until the effluent is colorless, the effluent being discarded.

The column on which the anthelmycin is adsorbed is eluted with about 100 liters of 1.4 percent aqueous ammonium hydroxide solution. The eluate containing the antibiotic is adjusted to pH 8.5 with hydrochloric acid and is concentrated under reduced pressure to about one-tenth of the original volume.

The concentrated eluate is again passed through a column containing a similar cation exchange resin, placed in the lithium cycle by previous washing with lithium hydroxide. The resin is washed as before with deionized water until the effluent is colorless, and the effluent is discarded. The adsorbed anthelmycin is eluted from the column with about five liters of 14 percent aqueous ammonium hydroxide solution and the eluate is concentrated to dryness under reduced pressure. The residue is dissolved in about 800 ml. of deionized water and the resulting solution is diluted with about 3200 ml. of methanol, then with ether to precipitate the anthelmycin, the quantity of ether being sufficient to cause substantially complete precipitation. The precipitate is filtered, washed with ether, and dried under vacuum. About 240 g. of anthelmycin are obtained in this way.

The amorphous antibiotic is dissolved in about 1500 ml. of deionized water and acetone is added to the point of turbidity. The resulting solution is kept at —15° C. until the anthelmycin crystallizes. The crystalline product is filtered rapidly with suction and is washed several times with acetone and ether. It is then transferred as rapidly as posisble to a vacuum drier. The filtration and washing must be carried out rapidly since the antibiotic, until it is thoroughly dried, is extremely hygroscopic and will deliquesce if allowed to remain exposed to the atmosphere. Once it has been completely dried, however, the product is no longer hygroscopic and can be handled normally. About 150 g. of crystalline anthelmycin are obtained from the first crop. Additional crops of crystals can be obtained by concentration of the mother liquor. The crystalline antibiotic decomposes above about 200° C. and has no well-defined melting point.

EXAMPLE 2

Acid addition salts of anthelmycin are prepared by treating the antibiotic with an equivalent amount of the selcted acid in methanol or other suitable inert solvent. The desired salt precipitates from the solution, is separated by filtration, and is dried under reduced pressure. The following will illustrate such a procedure.

To a solution containing 5 g. of anthelmycin in 20 ml. of water there is added dropwise a saturated aqueous solution of p-(p"-hydroxyphenylazo)benzenesulfonic acid until precipitation is complete. The crystalline precipitate is removed by filtration, recrystallized from water, and dried in a vacuum desiccator. The salt melts with decomposition above about 218° C.

The hydrochloride af anthelmycin is prepared in similar fashion. A solution containing 0.6 g. of anthelmycin in 5 ml. of 0.6 N hydrochloric acid is treated with sufficient acetone to cause turbidity. The turbid solution is kept at 5° C. until the salt crystallizes. The product is filtered, washed with acetone, and dried under reduced pressure. The salt decomposes at about 205° C.

We claim:

1. A method of producing anthelmycin which comprises cultivating *Streptomyces longissimus* ATCC 14562 in a culture medium containing assimilable sources of carbohydrate, nitrogen, and inorganic salts, under submerged aerobic conditions until a substantial amount of anthelmycin is produced by said organism in said culture medium.

2. A method of producing anthelmycin which comprises cultivating *Streptomyces longissimus* ATCC 14562 in a culture medium containing assimilable sources of carbohydrate, nitrogen, and inorganic salts, under submerged aerobic conditions until a substantial amount of anthelmycin is produced by said organism in said culture medium, and recovering the anthelmycin from said culture medium.

3. A member of the group consisting of the antibiotic anthelmycin and its acid addition salts, said antibiotic being a white, solid substance which is soluble in water and acidic aqeuous solutions, is somewhat soluble in methanol, and is relatively insoluble in ethanol, acetone, chloroform, butanol, and ether; which decomposes above 200° C.; which is weakly basic, having pK'a values of 3.3, 6.8, and 7.9 in water; which has an optical rotation $[\alpha]_D^{25°}$ of $-17.5°$ (1.58 percent in water); which gives a positive ninhydrin test for $\alpha$-amino acids and a positive Elston-Morgan test for amino sugars; which has the approximate composition of 44.39 percent carbon, 6.53 percent hydrogen, 10.39 percent nitrogen, and 38.69 percent oxygen; which has a molecular weight as calculated from titration data of about 660; which, when mulled in mineral oil, has the following distinguishable bands in its infrared absorption spectrum: 2.99, 6.04, 6.23, 6.69, 7.1 (shoulder), 7.77, 8.27, 8.65 (shoulder), 9.32, 9.7 (broad shoulder), 10.5 (broad shoulder), 11.3, and 12.8 microns; and which has an ultra-violet absorption spectrum in neutral and basic aqueous solutions showing intense absorption maxima at about 234 m$\mu$ and 267 m$\mu$ with absorptivity values of $$E_{1\ cm.}^{1\ percent} = 127 \text{ and } 135.5$$

respectively, and in aqueous acid solution has a single absorption maximum at about 274 m$\mu$ with an absorptivity value of $$E_{1\ cm.}^{1\ percent} = 198$$

4. Anthelmycin base as defined in claim 3.
5. The acid addition salts of anthelmycin as defined in claim 3.

No references cited.